US012687606B2

(12) United States Patent
Takada et al.

(10) Patent No.: US 12,687,606 B2
(45) Date of Patent: Jul. 21, 2026

(54) INFORMATION PROCESSING SYSTEM

(71) Applicant: TOYOTA JIDOSHA KABUSHIKI KAISHA, Toyota (JP)

(72) Inventors: Masaru Takada, Toyota (JP); Kazumi Aono, Tokyo (JP); Shingo Okeda, Nagoya (JP); Toru Furusawa, Yokohama (JP); Xiao Shao, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 18/764,765

(22) Filed: Jul. 5, 2024

(65) Prior Publication Data

US 2025/0155546 A1 May 15, 2025

(30) Foreign Application Priority Data

Nov. 14, 2023 (JP) ................................. 2023-193821

(51) Int. Cl.
| | |
|---|---|
| *G01S 7/00* | (2006.01) |
| *G01S 13/931* | (2020.01) |
| *G06V 20/58* | (2022.01) |
| *G06V 40/10* | (2022.01) |

(52) U.S. Cl.
CPC ............ *G01S 7/003* (2013.01); *G01S 13/931* (2013.01); *G06V 20/58* (2022.01); *G06V 40/10* (2022.01)

(58) Field of Classification Search
CPC ....... G01S 7/003; G01S 13/931; G06V 20/58; G06V 40/10
See application file for complete search history.

(56) References Cited

U.S. PATENT DOCUMENTS

| | | | |
|---|---|---|---|
| 10,809,081 B1 * | 10/2020 | Kentley-Klay | ........ G08G 1/202 |
| 2022/0081010 A1 * | 3/2022 | Urano | .................. G06Q 10/047 |
| 2022/0393781 A1 * | 12/2022 | Kim | ...................... H04B 17/373 |
| 2023/0251366 A1 | 8/2023 | Seo et al. | |
| 2024/0112293 A1 * | 4/2024 | Li | .......................... G06Q 10/02 |
| 2025/0029036 A1 * | 1/2025 | Park | .................. G01C 21/3423 |

FOREIGN PATENT DOCUMENTS

JP            2023-116424 A        8/2023

* cited by examiner

*Primary Examiner* — Ig T An
(74) *Attorney, Agent, or Firm* — SoraIP, Inc.

(57) ABSTRACT

An information processing system including a plurality of moving objects and an information processing device, wherein the plurality of moving objects include a communication device capable of communication using terahertz waves, and the information processing device includes a control unit configured to transmit a sensing request to a first moving object, receive a sensing result including a detection position of a detection object from the first moving object, and notify a second moving object of information related to the position of the predetermined user when the sensing result is a result of detecting a predetermined user, wherein the sensing by the first moving object is sensing using terahertz waves by the transmission and reception apparatus.

4 Claims, 5 Drawing Sheets

( S307 )

GET UE ID ASSOCIATED WITH A USER   S401

QUERY UE POSITION
TO 5GC (LOCATION SERVICE)   S402

S403

THE SENSING
POSITION IS WITHIN
UE POSITION?

YES        NO

S404

DETERMINE
THAT THE SENSING
TARGET IS A USER

S405

DETERMINE
THAT THE SENSING
TARGET IS NOT THE USER ( END )

410 UE POSITION
RANGE

POSITION
ERROR

UE
POSITION   412

Figure 5:
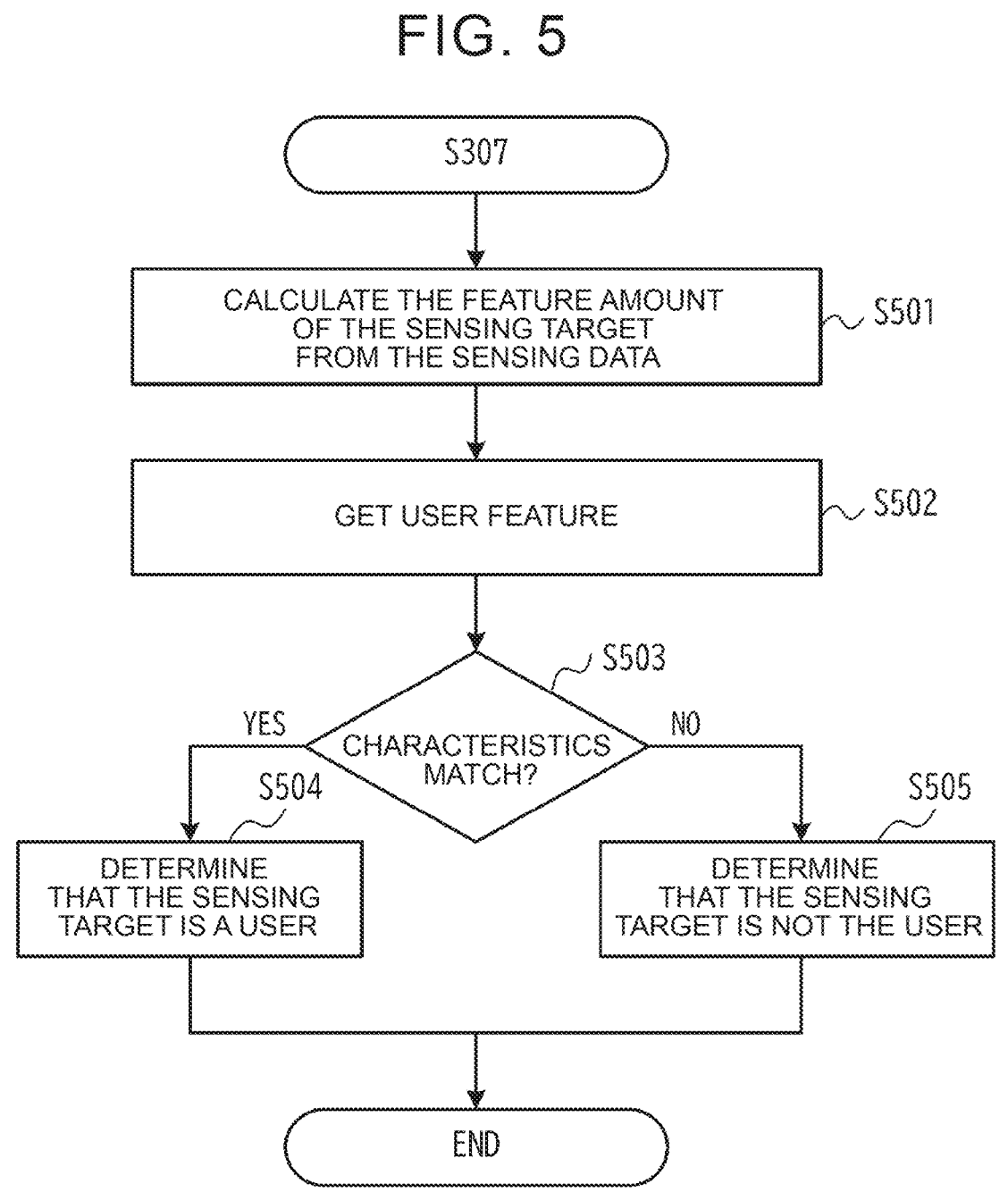

```
                    ┌─────────────────┐
                    │      S307       │
                    └─────────────────┘
                             │
                             ▼
        ┌────────────────────────────────────────┐
        │   CALCULATE THE FEATURE AMOUNT          │  ～ S501
        │     OF THE SENSING TARGET               │
        │     FROM THE SENSING DATA               │
        └────────────────────────────────────────┘
                             │
                             ▼
        ┌────────────────────────────────────────┐
        │          GET USER FEATURE               │  ～ S502
        └────────────────────────────────────────┘
                             │
                             ▼
                          ／ S503
       YES          ◇─────────────◇          NO
   ┌──────────────  CHARACTERISTICS  ──────────────┐
   │       S504     │    MATCH?    │      S505      │
   │                ◇─────────────◇                │
   ▼                                               ▼
┌──────────────────┐              ┌────────────────────────────┐
│    DETERMINE     │              │        DETERMINE           │
│ THAT THE SENSING │              │   THAT THE SENSING         │
│ TARGET IS A USER │              │ TARGET IS NOT THE USER     │
└──────────────────┘              └────────────────────────────┘
         │                                         │
         └────────────────────┬────────────────────┘
                              ▼
                    ┌─────────────────┐
                    │      END        │
                    └─────────────────┘
```

INFORMATION PROCESSING SYSTEM

CROSS-REFERENCE TO RELATED APPLICATION

This application claims priority to Japanese Patent Application No. 2023-193821 filed on Nov. 14, 2023, incorporated herein by reference in its entirety.

BACKGROUND

1. Technical Field

The present disclosure relates to an information processing system, and more particularly, to an information processing system that can determine a highly accurate position of a user.

2. Description of Related Art

Japanese Unexamined Patent Application Publication No. 2023-116424 (JP 2023-116424 A) discloses determination of the position of a pedestrian using a camera and a radar mounted on a vehicle.

SUMMARY

An object of an aspect of the present disclosure is to provide an information processing system that can determine a highly accurate position of a user.

An aspect of the present disclosure is an information processing system including a plurality of moving objects and an information processing device. Each of the moving objects includes a communication device configured to perform communication using a terahertz wave.

The information processing device includes a control unit configured to:

transmit a sensing request to a first moving object;

receive, from the first moving object, a sensing result including a detection position of a detected object; and when the sensing result is a result of detection of a predetermined user, notify a second moving object about information related to a position of the predetermined user.

Sensing by the first moving object is sensing using the terahertz wave by the communication device.

Another aspect of the present disclosure is an information processing method to be executed by an information processing system including a plurality of moving objects and an information processing device.

The information processing method includes:

transmitting, by the information processing device, a sensing request to a first moving object;

performing, by the first moving object, sensing by a communication device configured to perform communication using a terahertz wave, and transmitting a sensing result to the information processing device;

receiving, by the information processing device, the sensing result including a detection position of a detected object from the first moving object; and when the sensing result is a result of detection of a predetermined user, notifying, by the information processing device, a second moving object about information related to a position of the predetermined user.

According to the aspect of the present disclosure, it is possible to determine a highly accurate position of the user and to perform information processing based on highly accurate position information.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram for explaining another example of a process of determining whether or not a sensing target is a target user.

DETAILED DESCRIPTION OF EMBODIMENTS

Overview

Figure 1:
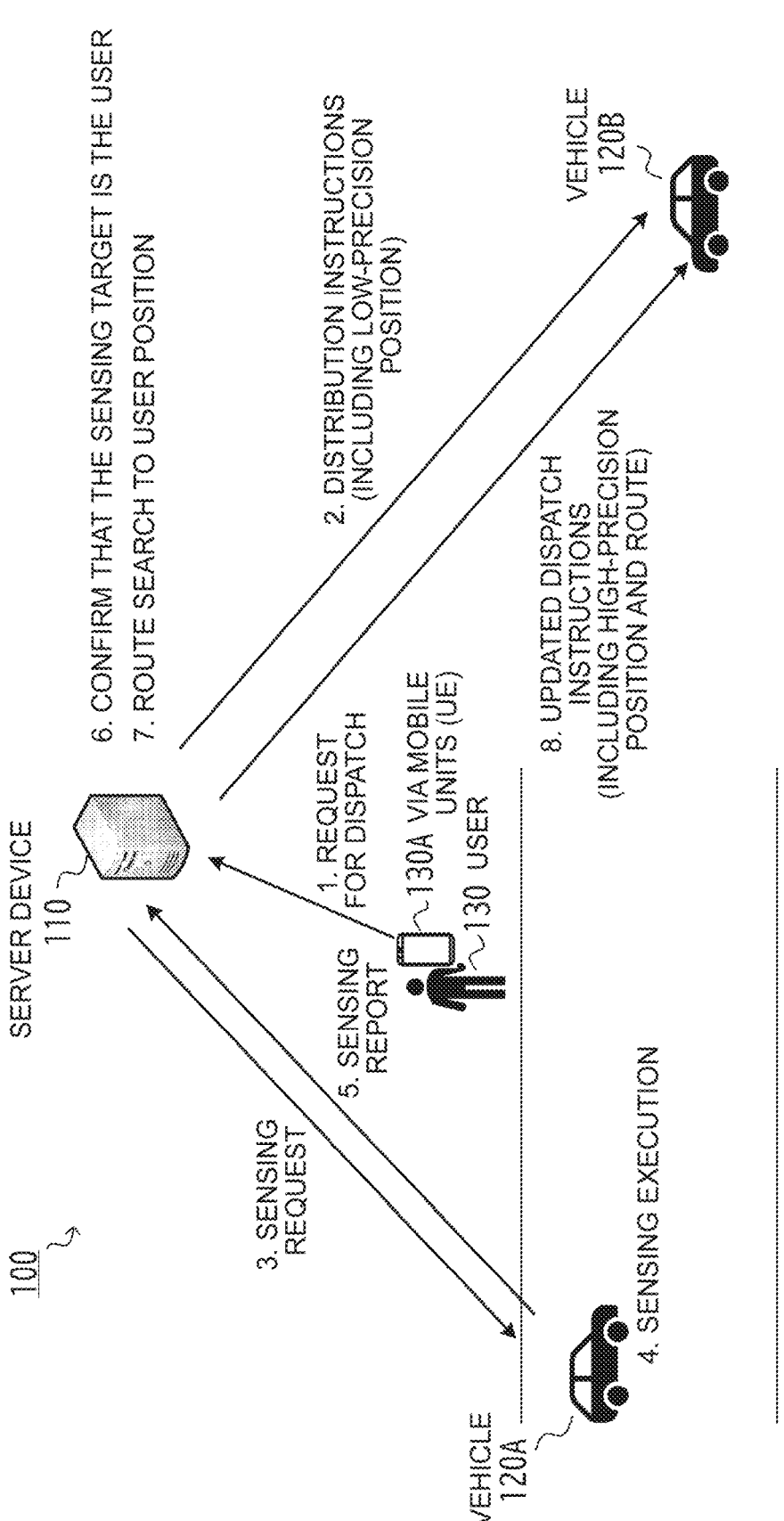
FIG. 1 is a diagram for explaining an outline of an information processing system according to an embodiment.

If the position information of the user can be accurately grasped, the position information can be used more effectively. For example, there is a demand for moving a vehicle in consideration of whether a user, such as a dispatch service, is located on a sidewalk on which side of a road. In such cases, position detection with finer accuracy than the road-width is required, but GPS device may not be able to obtain adequate accuracy.

In recent years, 5G communication has been performed using terahertz-waves. Further, object detecting using a terahertz-wave by a communication device for 5G communication has been proposed. Such sensing is also referred to herein as 5G sensing. By using 5G sensing, a highly accurate position can be detected.

An aspect of the present disclosure is an information processing system including a plurality of moving objects and an information processing device. The vehicle is typically a vehicle (including a battery electric vehicle, hybrid electric vehicle, a gasoline-powered vehicle), but may also be a flying object or another moving object. The moving object includes a communication device capable of performing communication using a terahertz wave. The communication device is a device capable of sensing using a terahertz wave, and is, for example, a 5G or a portable communication device of the next generation or later, but may be a terahertz wave radar device.

The information processing device transmits a sensing request to the first moving object, receives a sensing result including a detection position of a detected object from the first moving object, and, when the sensing result is a result of detecting a predetermined user, notifies the second moving object of information related to the position of the predetermined user.

The sensing result includes information on at least one of a position, a shape, and a type of the sensed object, or sensing data capable of calculating the information. In other words, the determination of the position, shape, type, and the like of the object based on the sensing data may be performed by the moving object, by the information processing device, or by another apparatus.

The information related to the position of the user may be the position of the user itself or may be any information obtained based on the position of the user. Examples of the information obtained based on the position of the user include a path to the position of the user.

The present disclosure is applicable to a service of dispatching a moving object to a user's position. For example, the control unit of the information processing device may acquire the first position information indicating the position of the predetermined user, and select a moving object to be moved to the position of the predetermined user as the second moving object. The second position information, which is the position information of the predetermined user with higher accuracy than the first position information, may be acquired based on the sensing result by the first moving object. The route from the current position of the second moving object to the position indicated by the second position information may be searched in consideration of which side of the road the second position information faces, and the searched route may be notified to the second moving object. In this way, the second moving object can be directed to the location where the user is located. In this case, it is considered which side of the road is located, so that the user can easily access the second moving object (such as boarding or delivery of goods). Note that the sensing request of the first moving object from the information processing device may be performed when the second moving object is located within a predetermined range from the first position information. This is because it is only necessary to know the detailed position of the user when the second moving object reaches a certain degree of the user.

In the present disclosure, whether the sensing result is a result of detecting a predetermined user may be determined by a moving object, by an information processing device, or by another apparatus. As an example, the information processing device may determine as follows.

The control unit of the information processing device may acquire user equipment (UE) ID associated with the predetermined user and acquire the position of UE having UE ID from the position information servers. In the present disclosure, the control unit of the information processing device may determine that the sensing result is a result of detecting a person and that the sensing result is a result of detecting the predetermined user when the detection position is included in a range of the position of UE. Since UE associated with the user can be considered to be carried by the user, the location of UE can be considered to be the location of the user. The location of UE is managed by a mobile communication system (e.g., a 5G core system). Therefore, when the detected position is included in the range of the position of UE, the sensed result can be regarded as the result of detecting the user, and the position of the user can be specified with higher accuracy than the accuracy managed by the portable communication system.

In the present disclosure, the sensing by the first moving object may include sensing by a camera. The control unit of the information processing device may determine that the sensing result is a result of detecting the predetermined user when the feature amount of the detected object obtained from the sensing result matches the feature amount of the predetermined user stored in advance. As the feature amount of the user, for example, a feature amount representing a feature of a face, a feature amount representing a feature of a body or an operation thereof can be adopted. As described above, it is possible to determine whether or not the detection target is the target user from the features obtained by the camera image.

According to the present disclosure, since the position of the user can be accurately grasped, it is possible to realize an effective service such as dispatch of a vehicle to the source of the user.

The present disclosure further includes a computer program for causing a computer to execute the steps of the method, and a computer program for implementing the network node or the information processing system using the computer. The present disclosure further includes a computer readable medium having recorded thereon the above-described computer program.

First Embodiment

Hereinafter, embodiments of the present disclosure will be described with reference to the drawings. The following embodiments are merely illustrative examples, and the present disclosure is not limited to the configuration of the embodiments. For example, although an information processing system related to a dispatch service is exemplified below, the present disclosure is applicable to an information processing system that performs arbitrary information processing using position information of a user.

System Overview

FIG. 1 is a diagram for explaining an outline of an information processing system (dispatch service system) according to the present embodiment. The information processing system 100 includes a server device 110 and a vehicle 120A, 120B, and dispatches any vehicle (vehicle 120B in FIG. 1) to the user 130 in response to a dispatch request from the user 130. Here, it is assumed that the server device 110 knows the positions of the respective vehicles 120A, 120B. In the following description, the vehicle 120A and the vehicle 120B are referred to as the vehicles 120 when they do not need to be distinguished from each other.

The operation of the system will be briefly described with reference to FIG. 1.

The user 130 requests the server device 110 to dispatch a vehicle using the mobile terminal (UE; user equipment) 130A (step 1). The dispatch request includes at least a user ID and a present position (or a pickup position) of the user, and may further include information such as a pickup time and a destination.

The server device 110 selects the assigned vehicle to be dispatched to the source of the user 130, and transmits a dispatch instruction to the assigned vehicle (step 2). The dispatch instruction includes at least a pickup position.

The server device 110 transmits a sensing request to the vehicle 120B located in the vicinity of the pick-up position (step 3). Upon receiving the sensing request, the vehicular 120A performs sensing of the surrounding object (step 4), and transmits the sensing result to the server device 110 (step 5). This sensing is performed using terahertz waves transmitted and received by a radio wave transmitting and receiving device for portable communication provided in a vehicular 120A. Sensing by the vehicular 120A may be performed by a sensor device such as a camera or a Lidar.

The server device 110 checks whether the sensing result obtained from the vehicle 120B is the result of detecting the user 130 (step 6). When the sensing result is the position of the user 130, the server device 110 can acquire the highly accurate position of the user 130. Therefore, the server device 110 searches for a route from the present position of the vehicle 120B to the user position (step 7). In this route search, considering which side of the roadway the user position faces, a route is required in which the vehicle 120B can be guided to each vehicle that is in contact with the sidewalk where the user is located. The server device 110 transmits an updated dispatch instruction including the determined route and the high-precision position of the user to the vehicle 120B.

By transmitting the route based on the highly accurate position of the user to the vehicle 120B as described above, the vehicle 120B can be easily moved to the source of the user.

Configuration

Figure 2A:
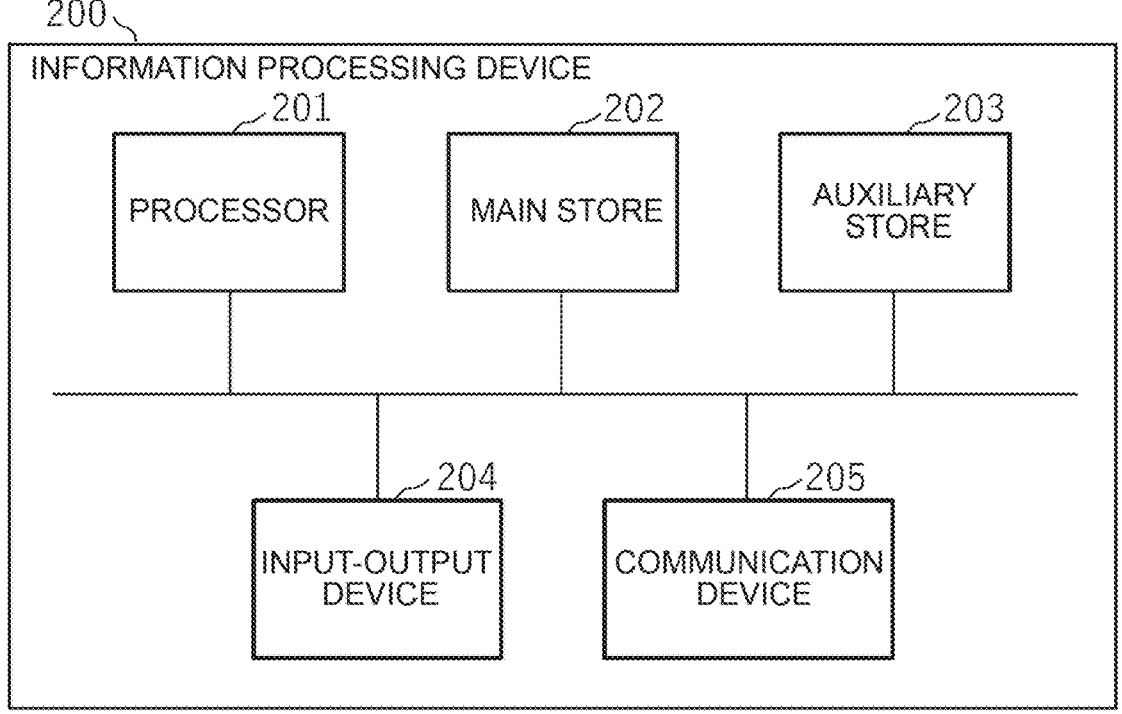
FIG. 2A is a diagram illustrating a configuration of an information processing device according to an embodiment.

FIG. 2A is a diagram illustrating an exemplary configuration of an information processing device (computer) 200 operable as a server device 110. The information processing device 200 can be configured using a dedicated or general-purpose information processing device (computer) such as a personal computer (PC), a workstation (WS), or a server machine. However, the information processing device 200 may be an aggregate (cloud) of one or more computers.

The information processing device 200 includes a processor 201 as a processing unit or a control unit (controller), a main storage device 202, an auxiliary storage device 203, an input/output device 204, and a communication device 205, which are mutually connected via a bus. When the processor 201 loads the program stored in the auxiliary storage device 203 into the main storage device 202 and executes the program, processing described later is executed.

The main storage device 202 is used as at least one of a program and data storage area, a program development area, a program work area, a communication data buffer area, and the like. The main storage device is composed of random access memory (RAM) or a combination of RAM and read-only memory (ROM).

The auxiliary storage device 203 is used as a storage area for data and programs. A non-volatile storage medium is applied to the auxiliary storage device. The non-volatile storage medium is, for example, a hard disk, a solid state drive (SSD), a flash memory, or an electrically erasable programmable read-only memory (EEPROM). Further, the auxiliary storage device 203 may include a drive device of a disk recording medium.

The input/output device 204 includes an input device such as a key, a button, a pointing device, and a touch panel, and an output device such as a liquid crystal display, and performs input of data from an operator and output of data to an operator.

The communication device 205 communicates with the vehicles 120, the mobile terminal 130A, and another device. The form of communication may be a wireless communication (5G, wireless LAN (Wi-Fi (registered trademark)), a BLE, or the like) or a wired communication.

Figure 2B:
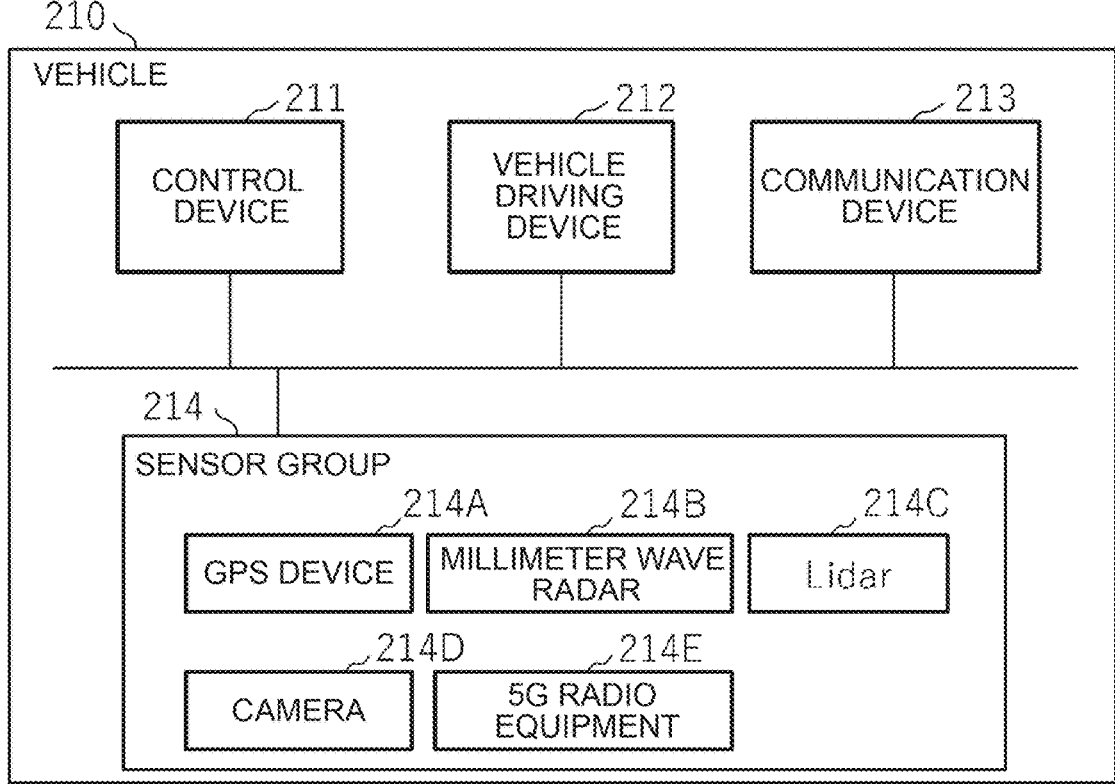
FIG. 2B is a diagram illustrating a configuration of an information processing device according to an embodiment.

FIG. 2B is a diagram illustrating a configuration of a vehicle. The vehicle 210 includes a control device 211, a vehicle driving device 212, a communication device 213, and a sensor group. The control device 211 is a computer including a processor and a storage device. The vehicle driving device 212 controls the traveling of the vehicle. The communication device 213 is a device that communicates with the server device 110, a base station, or another device, and in the present embodiment, is a wireless communication device that performs wireless communication based on 5G standard. The communication device 213 supports communication using a terahertz-wave in a 28 GHz/39 GHz band in addition to a frequency (sub-6) equal to or less than 6 GHz.

The sensor group 214 includes, for example, a GPS device 214A, a millimeter-wave radar 214B, Lidar 214C, and a camera 214D, 5G radio device 214E. GPS device 214A acquires the position information based on GPS signal. Millimeter-wave radar 214B use millimeter-waves to sense surrounding objects. Lidar 214C uses near infrared laser pulses to sense objects around it. The camera 214D acquires images of surrounding objects using visible light or near infrared light. A 5G radio device 214E senses surrounding objects using terahertz-waves used for 5G mobile communication. Although 5G radio device 214E is the same as the communication device 213 as the device, it is also shown as the communication device 213 and 5G radio device 214E in FIG. 2B because it can be used for both communication and sensing applications. In addition, the sensor group 214 may include a sensor for acquiring information about an object around the vehicle other than the above, a sensor for acquiring information about an object in the vehicle, a sensor for acquiring information about a state of the vehicle, and the like.

The mobile terminal 130A is the same as the information processing device 200 in that it includes a processor (control unit), a main storage device, a secondary storage device, an inputting device, and a communication device, and thus detailed explanation thereof is omitted. It should be noted that the communication device complies with 5G mobile communication standard.

Processing

Figure 3:
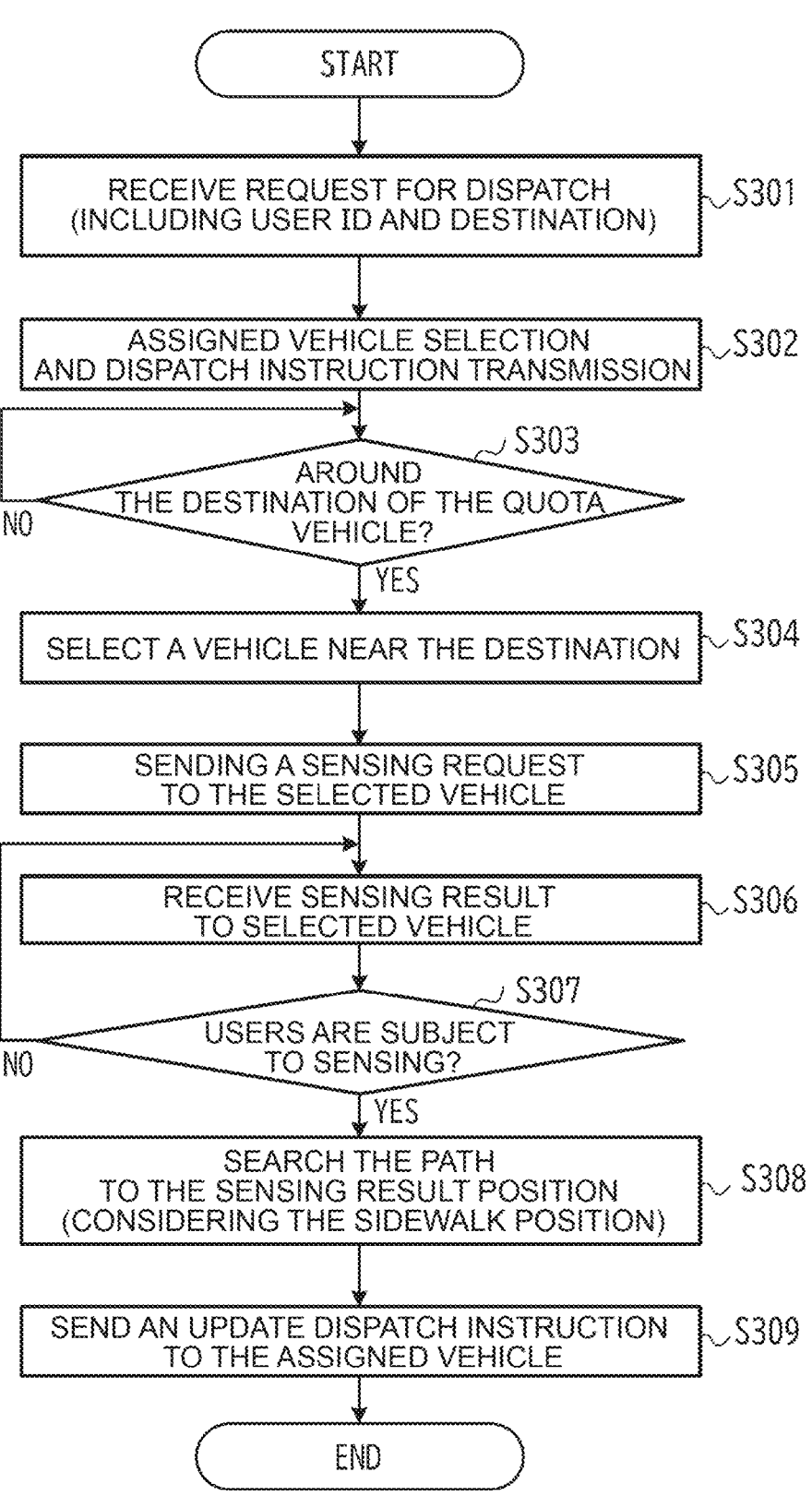
FIG. 3 is a flowchart illustrating a flow of processing performed by the information processing device according to the embodiment.

Hereinafter, an operation of the information processing system according to the present embodiment will be mainly described with reference to a process performed by the server device 110. FIG. 3 is a flowchart illustrating a flow of processing performed by the server device 110. In the following description, the fact that the processor (control unit) 201 of the server device 110 performs the processing is simply expressed as the server device 110 performing the processing.

In S301, the server device 110 receives a dispatch request from the mobile-terminal 130A. The dispatch request is a request that the user 130 requests any of the vehicles, and includes a user ID and a dispatch destination of the user 130. In the dispatch request, the dispatch destination of the mobile terminal 130A may be acquired in any manner. For example, the position acquired by 130A of the mobile terminal by GPS device may be used as the dispatch destination, or the position designated by the user using the mobile terminal 130A may be used as the dispatch destination. The information indicating the dispatch destination corresponds to the first position information in the present disclosure.

In S302, the server device 110 selects a vehicle to be assigned to the dispatch request from among a plurality of vehicles, and transmits a dispatch instruction to the selected assigned vehicle. A method of selecting an assigned vehicle is not particularly limited, but it is a typical method to select a vehicle close to a dispatch destination from among available vehicles. Here, it is assumed that the vehicle 120B illustrated in FIG. 1 is selected as the assigned vehicle. The selected assigned vehicle corresponds to the second moving object in the present disclosure. The dispatch instruction may include at least a dispatch destination, and may also include information about the user 130, information about a destination, and the like. The number of assigned vehicles is typically one, but may be a plurality.

In S302, the server device 110 determines whether or not the assigned vehicle 120B has arrived in the vicinity of the vehicle dispatch destination. Since each of the vehicles 120 periodically transmits the current position acquired by GPS device 214A to the server device 110, the server device 110 can grasp the current position of each of the vehicles 120. The degree of proximity to the "vicinity of the dispatch destination" may be appropriately determined according to the system requirements, but it may be conditional on being located at 1 km or less from the dispatch destination, for example. If the assigned vehicular 120B has arrived in the vicinity of the vehicle dispatch destination, the process proceeds to S304, and if not, the process waits.

In S304, the server device 110 selects the vehicle to be sensed from among the vehicles in the vicinity of the vehicle dispatch destination. Here, the reference "near the vehicle dispatch destination" may be the same as or different from S302, and in the present embodiment, it is conditional on being within 300 m closer to the reference of S302. Here, it is assumed that the vehicle 120A illustrated in FIG. 1 is selected as a vehicle to be sensed. The selected sensing vehicle corresponds to the first moving object in the present disclosure. It should be noted that there is no need to have one sensing vehicle, and a plurality of sensing vehicles may be used.

In S305, the server device 110 transmits a sensing request to the sensing vehicle 120A. The sensing request may be in any form as long as it is known to request sensing of an object around the vehicle, in particular, a person. The sensing request may or may not include the user ID and appearance of the user 130, the UE ID of the mobile terminal 130A, and the like.

The vehicular 120A that has received the sensing request performs sensing of a surrounding object using 5G radio device 214E. Specifically, the vehicular 120A transmits a terahertz wave used for the portable communication, and acquires the reflected wave to acquire information about the surrounding object. This sensing is also referred to as 5G sensing. In addition, the vehicle 120A may perform sensing using at least one of a millimeter-wave radar 214B, Lidar 214C and a camera 214D in addition to sensing using 5G radio device 214E. The shape and type of the detected object can be grasped from the obtained sensing data. Further, the position of the object detected from the obtained sensing data, in particular, the position relative to the vehicular 120A can be grasped. When determining that a person or the user 130 has been detected, the vehicular 120A transmits a sensing result including the detected position to the server device 110. Note that the vehicular 120A may transmit the sensor data to the server device 110, and the server device 110 may determine whether or not the detection target is a person and calculate the detection position.

In S306, the server device 110 receives the sensing data from the sensing-vehicle 120A.

In S307, the server device 110 determines whether the sensing result received from the sensing vehicle 120A is a result of detecting the user 130. Details of this determination will be described later. If the sensing result is not for the user 130, S306 returns to receive another sensing result. If the sensing is for the user 130, proceed to S308.

In S308, the server device 110 considers the detected position included in the sensing result as the position of the user 130, and searches for a route from the present position of the vehicle 120B to the sensing result position. At this time, the detection position included in the sensing result is higher in accuracy than the initial dispatch destination (first position information) or the relative relation with the position of the vehicle 120A is known, so that it is possible to know which side of the road on which the sensing vehicle 120A is traveling. Therefore, the server device 110 performs a route search specifying which side approaches the position of the user 130, thereby enabling route guidance to the vehicle facing the sidewalk where the user 130 is located. The information indicating the detection position included in the sensing result corresponds to the second position information in the present disclosure.

In S309, the server device 110 transmits, to the assigned vehicle 120B, an updated dispatch instruction including the route obtained by the highly accurate position and S308 of the user 130 obtained as a result of the sensing. As a result, the assigned vehicular 120B can know the highly accurate position of the user 130, can grasp the route to that position, and can easily move to the place where the user 130 is.

Figure 4A:
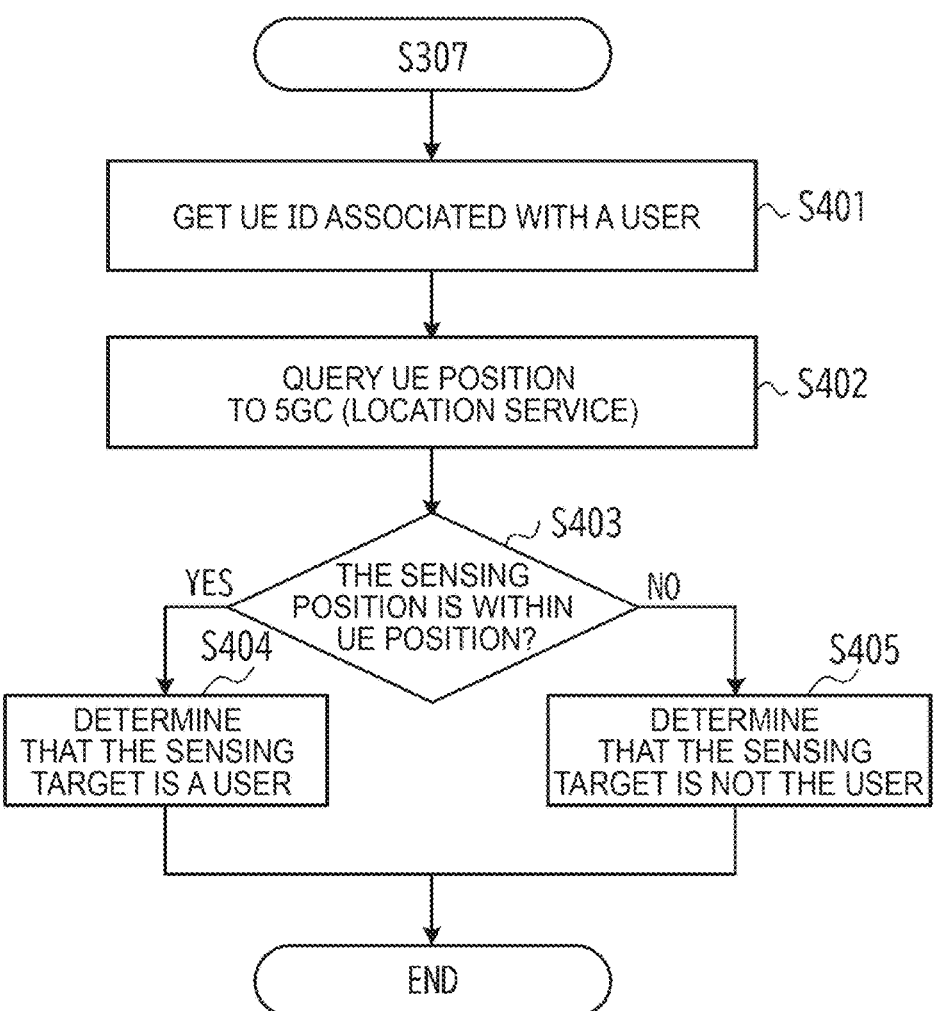
FIG. 4A is a diagram illustrating an exemplary process of determining whether a sensing target is a target user.
Figure 4B:
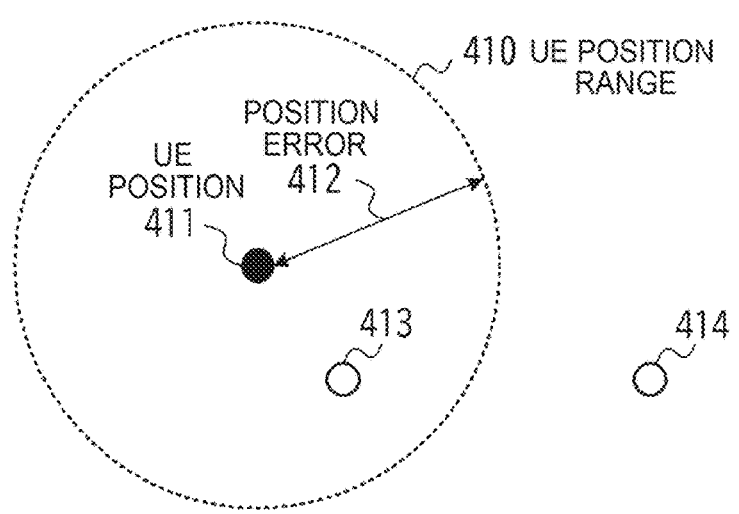
FIG. 4B illustrates an exemplary process of determining whether the sensing target is the target user.

Referring to FIGS. 4A and 4B, an exemplary process of determining whether the detected object in sensing in S307 is the user 130 will be described. FIG. 4A is a flowchart illustrating the details of the S307 process.

In S401, the server device 110 obtains a UE ID of UE 130A associated with the user 130. In S402, the server device 110 queries 5G core (5GC) system for the location of UE. 5G system manages the location of UE, and the location can be provided externally as a location service. The server device 110 may query the location including UE ID to obtain the location of UE. In S403, it is determined whether the sensing position is within a UE position obtained from 5G core system. If the sensing position is within UE position, the server device 110 determines that the sensing target is the user 130 (S404), and otherwise determines that the sensing target is not the user (S405). UE positions provided by 5G core-system include errors that are greater than the accuracy of the sensing, and are shown to a certain extent, including, for example, UE position 411 and the position error 412, as shown in FIG. 4B. On the other hand, the sensing results are more accurate and are shown, for example, as positions 413 and 414 in FIG. 4B. The position 413 is within UE position, and therefore, if the sensing position is the position 413, the sensing object is determined to be the user 130. On the other hand, the position 414 is outside UE position, and therefore, when the sensing position is the position 414, it is determined that the sensing target is not the user 130.

Referring to FIG. 5, another exemplary method of determining whether the detected object in sensing in S307 is the user 130 will be described. FIG. 5 is a flow chart illustrating a detailed process of S307.

In S501, the server device 110 calculates the characteristic quantity of the sensing target from the sensing data. For example, a feature quantity relating to the shape of the object may be acquired from 5G sensing, or a feature quantity representing the facial or physical characteristics of the object to be detected may be acquired from images obtained by the camera. The encoder for calculating the feature amount and the feature amount representing the feature of the object may be realized by using a known method.

In S502, the server device 110 acquires the characteristic quantity of the user 130. The server device 110 may acquire the feature quantity of the user in advance, store the feature quantity in the storage device in association with the user ID, and acquire the feature quantity by using the user ID as a key.

In S503, the server device 110 determines whether or not the characteristic quantities match, determines that the sensing object is the user 130 if the characteristic quantities match (S504), and determines that the sensing object is not the user 130 if the characteristic quantities match (S505).

Although the flow chart shown in FIG. 4A and FIG. 5 has been described as being executed by the server device 110, a vehicle 120A or another device may be executed.

Advantageous Effect of Embodiment

According to the present embodiment, the position of the user 130 can be grasped with high accuracy. Therefore, it is possible to present a route for guiding the vehicle 120B to a position where the user is present. Further, since the vehicle for which sensing is requested is limited to the vicinity of the presence position of the user 130, it is possible to suppress the impossibility of processing and communication. Further, by setting the sensing request to be a timing at which the assigned vehicular 120B approaches the vicinity of the user position, it is possible to restrain the user from moving after the sensing and wasting the sensing.

Other Embodiments

The above-described embodiment is merely an example, and the present disclosure may be appropriately modified and implemented without departing from the scope thereof.

For example, in the above-described embodiment, the sensing request is made when the assigned vehicular 120B approaches the position of the user, but the sensing request may be made without adding such a condition. Further, in the above-described embodiment, after the dispatch instruction is sent in S302, the updated dispatch instruction is sent in S309. However, the dispatch instruction of S302 may be omitted, and the dispatch instruction including the highly accurate position of the user and the route to the position may only be transmitted. Thus, various modifications are possible.

The technology of the present disclosure is also applicable to services other than the dispatch service. For example, the present disclosure is applicable to a service such as a delivery service in which a moving object is dispatched to the source of the user 130. Further, the present disclosure can be applied to any service that acquires and uses a highly accurate position of the user 130 without dispatching a moving object.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. Non-transitory computer-readable storage media include, for example, magnetic disks (floppy (registered trademark) disks, hard disk drives (HDD), etc.). Non-transitory computer-readable storage media include, for example, any type of disc, such as an optical disc (CD-ROM, DVD disc, Blu-ray disc, etc.). Non-transitory computer-readable storage media include, for example, read only memory (ROM), random access memory (RAM), EPROM, EEPROM, magnetic cards, flash memory, optical cards, any type of media suitable for storing electronic instructions.

What is claimed is:

1. An information processing system comprising a plurality of moving objects and an information processing device, wherein each of the moving objects includes a communication device configured to perform communication using a terahertz wave, the information processing device includes a control unit configured to:

transmit a sensing request to a first moving object;

receive, from the first moving object, a sensing result including a detection position of a detected object; and when the sensing result is a result of detection of a predetermined user, notify a second moving object about information related to a position of the predetermined user, sensing by the first moving object is sensing using the terahertz wave by the communication device, and the control unit is further configured to:

acquire first position information indicating the position of the predetermined user;

select a moving object to be moved to the position of the predetermined user as the second moving object;

transmit the sensing request to the first moving object when the second moving object is located within a predetermined range from the first position information;

acquire, based on the sensing result, second position information that is position information of the predetermined user with a higher accuracy than an accuracy of the first position information; and search for a route from a current position of the second moving object to a position indicated by the second position information in consideration of a side of a road where the position indicated by the second position information is present, and notify the second moving object about the route obtained by searching.

2. The information processing system according to claim 1, wherein the communication device is a mobile communication device to be used for mobile communication.

3. The information processing system according to claim 1, wherein the control unit is configured to:

acquire a user equipment identifier associated with the predetermined user;

acquire a position of user equipment having the user equipment identifier from a position information server; and when the sensing result is a result of detection of a person and the detection position is included in a range of the position of the user equipment, determine that the sensing result is the result of the detection of the predetermined user.

4. The information processing system according to claim 1, wherein:

the sensing by the first moving object includes sensing by a camera; and the control unit is configured to determine that the sensing result is the result of the detection of the predetermined user when a feature amount of the detected object obtained from the sensing result agrees with a prestored feature amount of the predetermined user.

\* \* \* \* \*